United States Patent [19]

Friedrich et al.

[11] 4,147,025
[45] Apr. 3, 1979

[54] FORMATION OF AUXILIARY DRIVE GAS FOR TURBINE

[75] Inventors: Helmut Friedrich, Bremen; Jürgen Schaper, Ganderkesee, both of Fed. Rep. of Germany

[73] Assignee: Vereinigte Flugtechnische Werke-Fokker GmbH, Bremen, Fed. Rep. of Germany

[21] Appl. No.: 777,094

[22] Filed: Mar. 14, 1977

Related U.S. Application Data

[63] Continuation-in-part of Ser. No. 520,002, Nov. 1, 1974, abandoned.

[51] Int. Cl.² .............................. F02C 7/26; F02C 7/32
[52] U.S. Cl. .................................. 60/39.06; 60/39.14; 60/39.46 R
[58] Field of Search .................... 60/39.06, 39.14, 215, 60/46 M, 46 R, 39.27, 39.33

[56] References Cited

U.S. PATENT DOCUMENTS

| | | | |
|---|---|---|---|
| 2,900,788 | 8/1959 | Felberg et al. | 60/215 |
| 2,906,091 | 9/1959 | Kretschmer | 60/39.27 |
| 3,093,968 | 6/1963 | Osofsky | 60/39.14 |
| 3,149,460 | 9/1964 | La Rocca | 60/39.46 M |
| 3,707,074 | 12/1972 | Meyer et al. | 60/39.71 |
| 3,828,551 | 8/1974 | Schmidt | 60/39.14 |

FOREIGN PATENT DOCUMENTS 160338  7/1952  Australia ................... 60/39.66

*Primary Examiner*—Carlton R. Croyle
*Assistant Examiner*—Thomas I. Ross
*Attorney, Agent, or Firm*—Smyth, Pavitt, Siegemund, Jones & Martella

[57] ABSTRACT

An auxiliary gas turbine in an aircraft is driven by adding dimethyl-hydrazine to Kerosine and producing propellant gas by adding $HNO_3$ or $N_2O_4$ as oxidizer. Additional Kerosine is injected into the resulting gas for matching the gas constant of that gas to the gas constant of regular combustion gas which normally drives the turbine.

7 Claims, 1 Drawing Figure

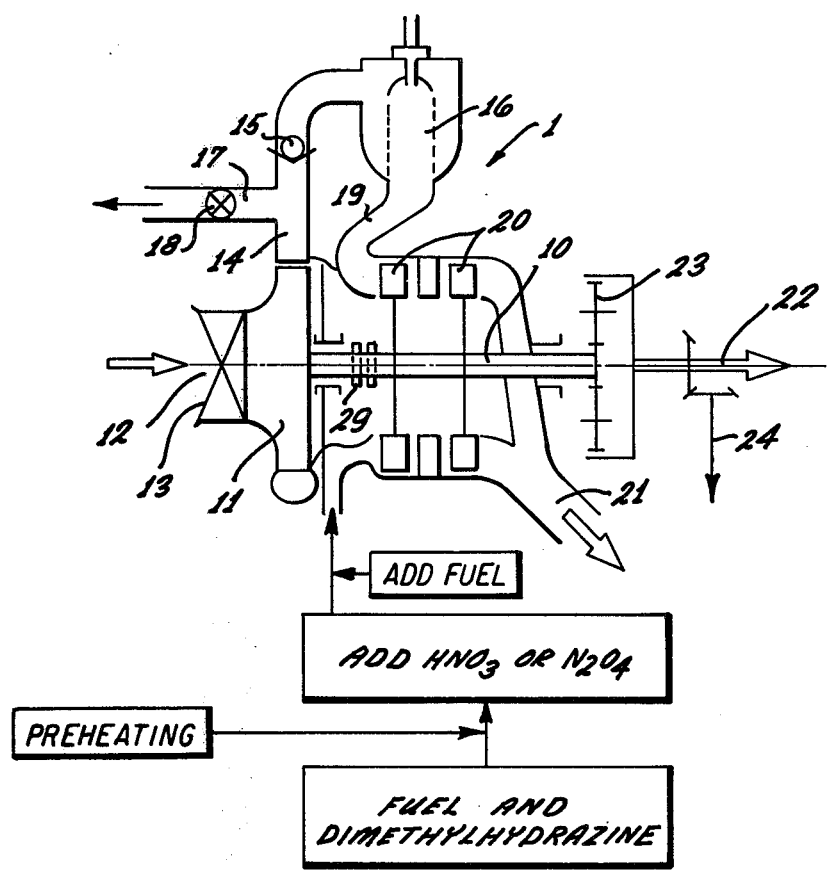

FORMATION OF AUXILIARY DRIVE GAS FOR TURBINE

This application is a continuation-in-part of Ser. No. 520,002 filed on Nov. 1, 1974, now abandoned.

BACKGROUND OF THE INVENTION

The present invention relates to operation of an auxiliary gas turbine as used for starting an aircraft engine and for driving other, on-board auxiliary equipment, such as an electric generator, hydraulic pumps, fuel pumps, etc. More particularly the invention relates to equipment for operating such a gas turbine under conditions which do not permit sustaining regular combustion for reasons of lack of adequate air supply.

Present day aircraft are usually equipped with a gas turbine for starting the engines without requiring assistance from ground equipment. However, the turbine is used also for driving auxiliary, secondary power generating and supply equipment, such as hydraulic pumps, generators etc. when the aircraft engines are off. Moreover, it was found advisable to have two power supply channels on board, one being driven by one of the engines and the second one by the gas turbine. This is particularly of advantage in the case of engine failure as the alternative power supply channel, driven by the gas turbine, remains functioning. In the case of a VTOL aircraft, the one channel is driven by a forward thrust producing engine; if it fails, the aircraft can still operate with the lift producing engines while the gas turbine drives the second power supply channel.

The operation of a gas turbine is not always without problems. When run by regular combustion, an adequate amount of air is needed to sustain combustion. Since low air pressure at high altitudes precludes such supply, it has been suggested to tap the compressor of an engine and to draw air therefrom as that compressor is sufficiently powerful. This is an adequate solution to the problem but fails when the particular engine drops out.

As an alternative solution to the problem of driving a gas turbine when insufficient air is present for combustion, it has been suggested to drive the gas turbine with gas developed, e.g., by decomposing hydrazine. The gas generated in a hydrazine decomposing reaction chamber will be fed directly to a turbine stage of the auxiliary gas turbine. The problem exists here that the thermodynamic conditions of operating the gas turbine with combustion gases or with hydrazine decomposition gases differ substantially.

DESCRIPTION OF THE INVENTION

It is an object of the present invention to improve the operation of a gas turbine in an aircraft.

It is a particular object of the invention to improve or make possible the operation of a gas turbine in an aircraft under conditions in which ambient air is insufficient to sustain combustion.

In accordance with the preferred embodiment of the invention, it is suggested to generate propellant gas for a gas turbine by using aircraft fuel and causing it to react with an oxidizer, preferably $HNO_3$ or $N_2O_4$, and the resulting gas is additionally mixed with aircraft fuel, upon passing to the turbine. Preferably a hypergolic fuel component, preferably unsymmetric dimethylhydrazine, is added to the aircraft fuel prior to reaction with the oxidizer in order to initiate the reaction during start-up.

The aircraft fuel as used here for the generation of propellant gas for the gas turbine may be preheated or even evaporated; one can use here heat exchange with the exhaust gases of the turbine. This way, the cooling effect of the added fuel on the propellant gas can be reduced.

The basic system which can be employed for practicing the invention is shown by way of example in the copending application of one of U.S., Ser. No. 473,500 filed May 28, 1974, now U.S. Pat. No. 4,092,824, to be modified to produce first a hypergolic system and to which is added the oxidizer with additional injection of aircraft fuel into the resulting gas.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

The FIGURE illustrates somewhat schematically an example of the preferred embodiment of the invention.

In particular, the FIGURE shows an auxiliary gas turbine 1 having a shaft 10 which carries a compressor 11. An airscoop and entrance 12 for air to be compressed is provided along the axis of the system but a throttle 13, such as a blocking valve or a throttling vane, may close entrance 12. The air as compressed by compressor 11 is fed to a channel or duct 14, which can be closed by a valve 15. The duct 14 leads to a combustion chamber 16 which receives also fuel in the usual manner to obtain combustion, and the resulting pressurized gas drives the turbine.

A branching duct 17, closable by a valve 18, can tap the compressor 11, so that compressed air is used additionally, for example, for an air-conditioning system.

The gases developed in combustion chamber 16 are fed to the turbine 1 via a duct 19 to drive the blades 20 of the turbine. The turbine, in effect, decompresses the combustion gases and is driven thereby to drive the shaft 10. An exhaust pipe 21 discharges the compressed gases.

Shaft 10 drives a transmission gear 23 having an output shaft 22, possibly geared to another shaft 24 for connection to the equipment driven by the gas turbine, such as fuel pump, lubrication oil pump, electric generator, etc. All this equipment is vital for continued operation of the aircraft.

The gas turbine 1 is normally operated by means of gases which are produced by combustion of aircraft fuel such as Kerosine in the combustion chamber 16; and the turbine will be constructed accordingly. The state of the combustion products driving the turbine is essentially characterized by three parameters. The temperature $T_A$ of the gases following combustion, the gas constant $R_A$ and the adiabatic exponent $\kappa_A$. The blades 20 of the turbine 1 are designed as to contour to operate with the gas having these parameters.

The alternative mode of generating propellant gases for the turbine arises and becomes necessary when combustion cannot be sustained, because, e.g., the aircraft which is equipped with this gas turbine, flies at too high an altitude, so that air is available at insufficient quantities only. The invention permits running the turbine under such conditions.

In particular, the alternative gas supply is furnished by reacting aircraft fuel with an oxidizer other than air, e.g., $N_2O_4$ or $HNO_3$. These gases produced externally (vis-a-vis internal combustion) are produced with an excess of fuel, rather than under conditions of an excess of oxygen or air as is the case for regular combustion. Hence, oxygen is not available for combustion of fuel other than through the said reaction.

As a consequence of the external production of gas, the parameters thereof are different. Primarily, the gas constant $R_B$ is much higher than $R_A$. Also, the temperature $T_B$ is somewhat higher than $T_A$. The adiabatic exponent is not significantly affected. In view of the disparity in the gas constants and also in the temperatures, the speed of sound $V_B$ is much higher than $V_A$ as in regular combustion gases. As a consequence, the flow conditions which determined the turbine design, are incorrect, since the speed of sound is a major design parameter of the turbine.

It was found that just adding Kerosine to the external gases, without incurring combustion, the molecular weight of the gas is changed because the added Kerosine vaporizes immediately. Accordingly, the gas constant is lowered and approaches again $R_A$. Concurrent cooling is a beneficial but unimportant side effect, because present day turbine blades could be designed to take the increased temperature. Nevertheless, the current change in parameters is in the right direction in each case. Thus, more generally speaking, the propellant gas as produced by the inventive method is matched to the turbine to obtain a favorable thermodynamic operation and conditions even though the turbine is operated in a manner for which it is not directly designed.

The aircraft carries, of course, engine fuel, for example JP-4 or Kerosine. Fuel is tapped for gas turbine operation and mixed with, for example, dimethylhydrazine to obtain a hypergolic system. The resulting fuel is combusted with $HNO_3$ or $N_2O_4$, which is provided for just that purpose. Finally, the same engine fuel is added to lower the gas constant of the resultant gases so that the resulting thermodynamic state matches quite closely the state needed to run the gas turbine under optimized conditions. Alternatively to hypergolisation other ways of initiation of the reaction could be applied, e.g. electrical ignition.

For practicing the invention, one will use ratios from 85% to 15%, up to 50% to 50% of aircraft fuel (Kerosine) to dimethylhydrazine. The resulting hypergolic mixture is mixed with oxidizer at ratios from 30% to 15% hypergolic mixture to 70% to 85% oxidizer.

The gases as produced in that manner are quite hot and additional Kerosine may be injected which will vaporize immediately. The amount of Kerosine added here is about 0.7 kilogram per kilogram of the total amount of Kerosine used (per unit time) for driving a particular gas turbine. The amount of Kerosine added here permits an even closer matching of the operating conditions, particularly if the turbine operates otherwise under differing conditions.

It is pointed out, however, that the propellant gases as produced by the invention, do not have to be used in a gas turbine that is normally driven otherwise. Rather, a turbine may be driven by this new propellant gas regularly. Thus, such a turbine may be provided as an additional auxiliary turbine to be used when the regular auxiliary turbine is not usable for any reason.

The propellant gas as produced in the manner described above can be used also to start a gas turbine prior to being operated by gases produced through combustion of aircraft fuel. This way, a separate starter motor for the gas turbine is not needed, and, for example, batteries and cable needed just for furnishing power to the starter motor can be eliminated. This actually improves reliability when the gas turbine is to be started under very low temperature conditions.

The invention is not limited to the embodiments described above but all changes and modifications thereof not constituting departures from the spirit and scope of the invention are intended to be included.

We claim:

1. Method of operating a gas turbine by means of propellant gas generated under conditions in which regular combustion of aircraft fuel with air cannot be sustained, but by the following steps:
 providing regular aircraft fuel;
 reacting the aircraft fuel with an oxidizer other than oxygen of ambient air including igniting the oxidented fuel to obtain a propellant gas by exothermic reaction; and
 adding aircraft fuel to the propellant gas prior to charging the gas turbine for operation thereof, the added fuel evaporating in the gas at least to a substantial extent fails to undergo combustion and being added for reducing the gas constant of said propellant gas.

2. Method as in claim 1, the oxidizer being $HNO_3$.

3. Method as in claim 1, the oxidizer being $N_2O_4$.

4. Method as in claim 1, and including adding a hypergolic fuel component to the regular fuel of the providing step, prior to the reacting step.

5. Method as in claim 4, using unsymmetric dimethylhydrazine as hypergolic fuel component.

6. Method as in claim 1, and including preheating the aircraft fuel prior to reaction with the oxidizer.

7. Method as in claim 1, for use of starting a gas turbine, and operating the gas turbine subsequently through regular combustion gases.

* * * * *

UNITED STATES PATENT AND TRADEMARK OFFICE
CERTIFICATE OF CORRECTION

PATENT NO. : 4,147,025
DATED : April 3, 1979
INVENTOR(S) : Helmut Friedrich et al.

It is certified that error appears in the above-identified patent and that said Letters Patent are hereby corrected as shown below:

On the cover sheet add:

-- [30] Foreign Application Priority Data

| Nov. 2, 1973 | Germany | 23 54 721 |
| Nov. 26, 1973 | Germany | 23 58 721 |

Signed and Sealed this

Eighth Day of April 1980

[SEAL]

Attest:

SIDNEY A. DIAMOND

Attesting Officer

Commissioner of Patents and Trademarks